(12) United States Patent
Mitchell et al.

(10) Patent No.: US 7,748,741 B2
(45) Date of Patent: Jul. 6, 2010

(54) SPOOL TENSIONING DEVICE FOR AIRBAG INSTALLATION

(75) Inventors: Abraham J. Mitchell, Logan, UT (US); Kurt Gammill, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 478 days.

(21) Appl. No.: 11/593,282

(22) Filed: Nov. 6, 2006

(65) Prior Publication Data
US 2008/0106084 A1     May 8, 2008

(51) Int. Cl.
*B60R 21/16*     (2006.01)
(52) U.S. Cl. .................. 280/743.2; 280/743.1
(58) Field of Classification Search .............. 280/743.2, 280/730.2, 728.2, 743.1, 730.1
See application file for complete search history.

(56) References Cited

U.S. PATENT DOCUMENTS

| | | | | |
|---|---|---|---|---|
| 3,774,936 | A * | 11/1973 | Barnett et al. ............. | 280/730.1 |
| 5,232,244 | A * | 8/1993 | Itoh ........................... | 280/749 |
| 5,462,308 | A * | 10/1995 | Seki et al. .................. | 280/749 |
| 6,135,497 | A * | 10/2000 | Sutherland et al. ......... | 280/749 |
| 6,464,250 | B1 * | 10/2002 | Faigle et al. ............. | 280/730.2 |
| 6,494,486 | B2 * | 12/2002 | Pausch et al. ............ | 280/743.2 |
| 7,165,783 | B2 * | 1/2007 | Karlbauer et al. ........ | 280/730.2 |
| 7,172,212 | B2 * | 2/2007 | Aoki et al. ............... | 280/730.2 |
| 2002/0175502 | A1 * | 11/2002 | Tesch et al. .............. | 280/730.2 |
| 2003/0116946 | A1 * | 6/2003 | Roos ........................ | 280/730.2 |
| 2004/0140653 | A1 * | 7/2004 | Bossecker et al. ........ | 280/730.2 |
| 2008/0106073 | A1 * | 5/2008 | Garner et al. ............ | 280/728.2 |

FOREIGN PATENT DOCUMENTS

WO    WO 2006/083246     8/2006

OTHER PUBLICATIONS

Amendment and Response to Office Action filed Sep. 8, 2009 in co-pending U.S. Appl. No. 11/593,426.
Terminal Disclaimer filed Sep. 8, 2009 in co-pending U.S. Appl. No. 11/593,426.
Office Action issued Mar. 9, 2009 in co-pending U.S. Appl. No. 11/593,426.
Interview Summary issued Oct. 19, 2009 in co-pending U.S. Appl. No. 11/593,426.
Petition to Withdraw Terminal Disclaimer filed Nov. 2, 2009 in co-pending U.S. Appl. No. 11/593,426.
Supplemental Amendment and Response to Office Action filed Nov. 2, 2009 in co-pending U.S. Appl. No. 11/593,426.

* cited by examiner

*Primary Examiner*—Paul N Dickson
*Assistant Examiner*—Drew Brown
(74) *Attorney, Agent, or Firm*—Sally J. Brown; Stoel Rives LLP

(57) ABSTRACT

An airbag assembly comprises a tensioning mechanism including a clutch is disclosed. The tensioning mechanism maintains the airbag in a desired position upon installation. In one embodiment, an inflatable curtain is coupled to a spool clutch and fastener via a tether to provide tension along the longitudinal mounting surface of the inflatable curtain during its installation adjacent the vehicle roof rail.

23 Claims, 11 Drawing Sheets

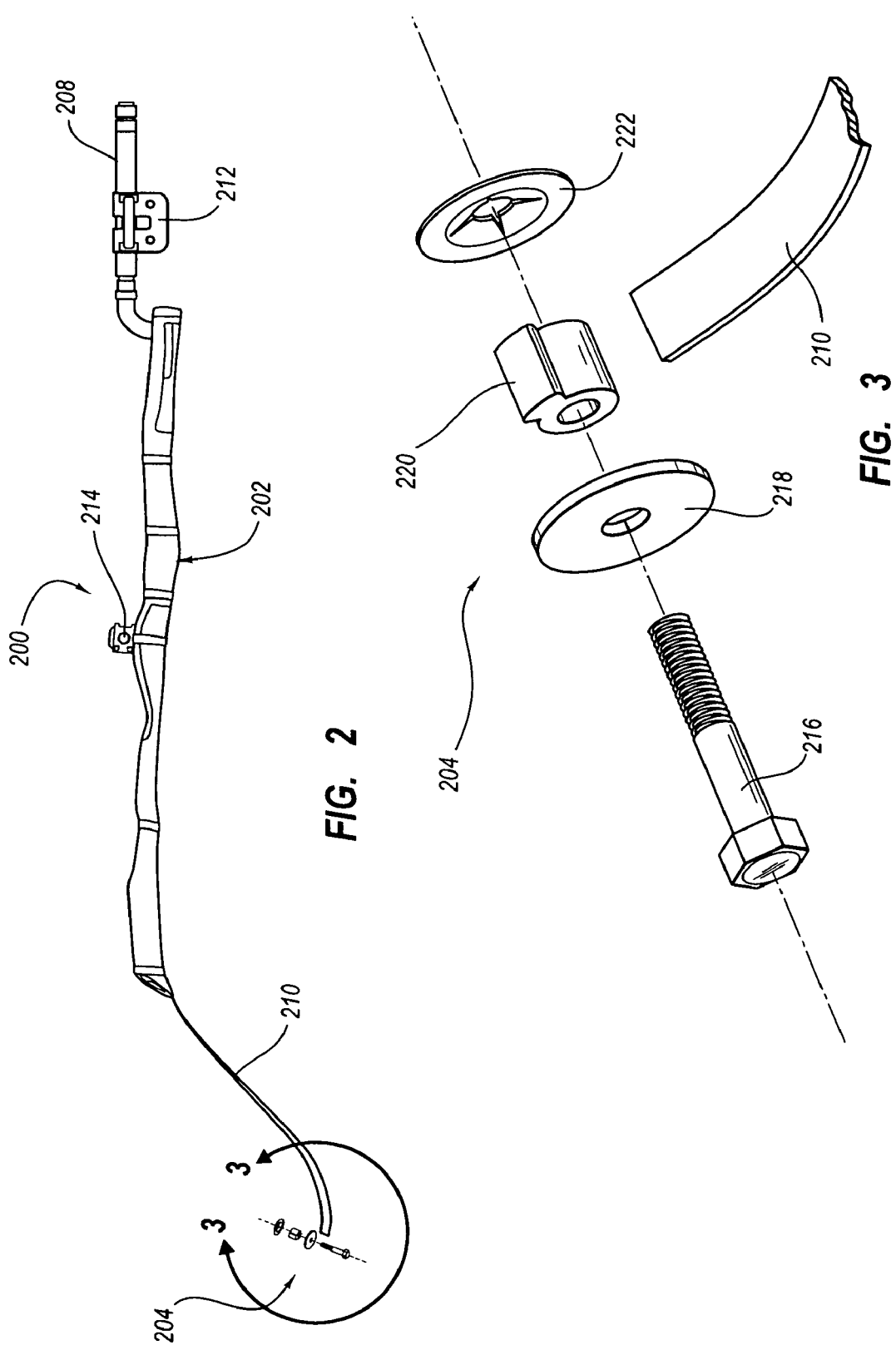

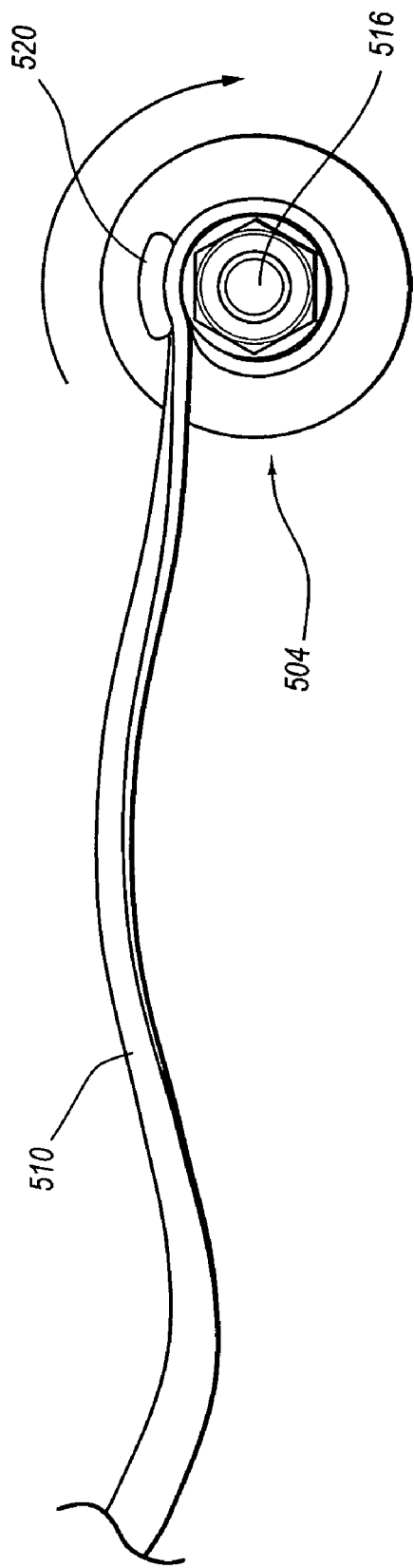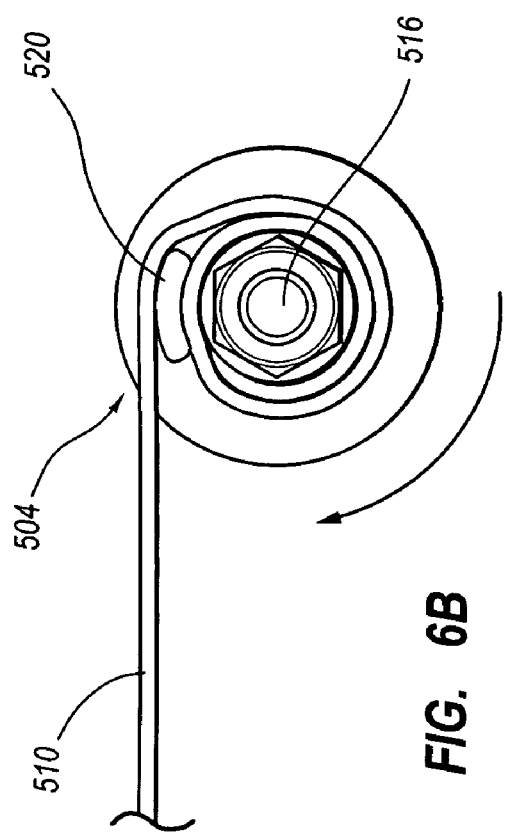
FIG. 6A
FIG. 6B

SPOOL TENSIONING DEVICE FOR AIRBAG INSTALLATION

TECHNICAL FIELD

The present disclosure relates generally to the field of automotive protective systems. More specifically, the present disclosure relates to airbag mounting systems, such as inflatable curtain airbag mounting systems.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the scope of the present disclosure, the embodiments will be described and explained with specificity and detail in reference to the accompanying drawings as provided below.

FIG. 2 is a side elevation view of another embodiment of an inflatable curtain airbag coupled to an exploded perspective view of another embodiment of a spool tensioning device.

FIG. 3 is a close-up exploded perspective view of the spool tensioning device of FIG. 2.

FIG. 6A is a side elevation view of one embodiment of a spool tensioning device in which the bolt and spool tensioning device are turning together while the tether is loose and winding.

FIG. 6B is a side elevation view of the spool tensioning device of FIG. 6A in which the spool tensioning device is stationary while the bolt is still turning while the tether is tight and tensioned.

Figure 1:
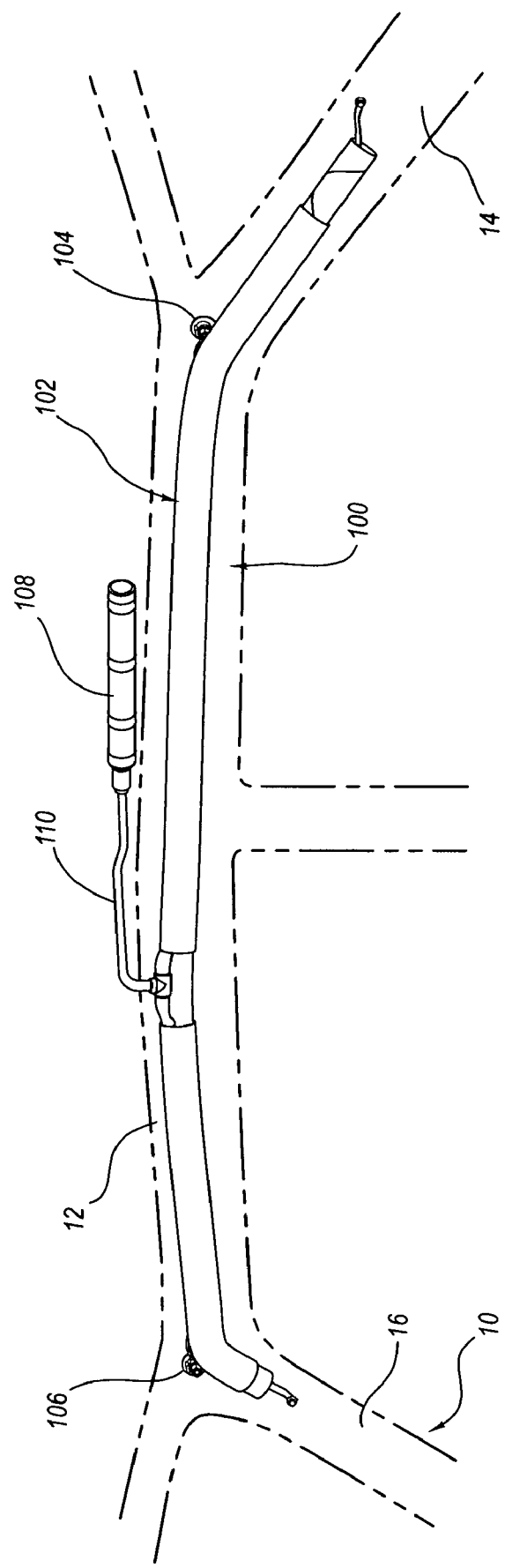
FIG. 1 is a perspective view of an inflatable curtain airbag mounted adjacent a roof rail of a vehicle, and one embodiment of a spool tensioning device disposed near both ends of the inflatable curtain.

INDEX OF ELEMENTS IDENTIFIED IN THE DRAWINGS 10 vehicle
12 roof rail
14 A-pillar of vehicle
16 C-pillar of vehicle
100 airbag assembly
102 inflatable curtain
104 first tensioning mechanism
106 second tensioning mechanism
108 inflator
200 airbag assembly
202 inflatable curtain
204 spool tensioning device
208 inflator
210 tether
212 inflator mounting
214 mounting orifice
218 washer
220 spool clutch
222 self-locking fastener
304 spool tensioning device
316 bolt
320 spool clutch
322 self-locking fastener
404 spool tensioning device
416 bolt
420 spool clutch
424 inner annular component
426 outer annular component
410 tether
428 loop in tether
504 spool tensioning device
516 bolt
520 spool clutch
510 tether
604 spool tensioning device
616 bolt
618 washer
620 spool clutch
622 self-locking fastener
630 weld nut
704 spool tensioning device
716 bolt
718 washer
720 spool clutch
722 locking washer
804 spool tensioning device
816 bolt
820 spool tensioning clutch
824 inner cavity of spool clutch
832 groove
834 protrusion
904 spool tensioning device
916 fastener
920 spool tensioning clutch
924 inner cavity
932 spring-loaded wedge detent
934 channel
1004 spool tensioning device
1016 fastener
1020 spool tensioning clutch
1024 inner cavity 1032 ball detent mechanism
1034 channel
1120 spool tensioning clutch
1124 inner cylinder
1126 outer cylinder
1134 channel
1220 spring clutch
1224 inner cylinder
1226 outer cylinder
1240 springs
1320 roller ramp clutch
1324 inner cylinder
1326 outer cylinder
1340 ball detent
1342 ramp

DETAILED DESCRIPTION

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically included.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The phrases "attached to" or "attached directly to" refer to interaction between two or more entities which are in direct contact with each other or are separated by a fastener.

Inflatable airbag systems are widely used to minimize occupant injury in a collision scenario. Airbag modules have been installed at various locations within a vehicle, including, but not limited to, the steering wheel, the instrument panel, within the side doors or side of seats, adjacent the roof rail of the vehicle, in an overhead position, or at the knee or leg position.

Inflatable curtain airbags may be used to protect the passengers of a vehicle during a side collision or roll-over collision. Inflatable curtains typically extend longitudinally within the vehicle and are usually coupled to or next to the roof rail of the vehicle. The inflatable curtain may expand in a collision scenario along the side of the vehicle between the vehicle passengers and the side structure of the vehicle. In a deployed state, an inflatable curtain may cover at least a portion of the side windows and the B-pillar of the vehicle. In some embodiments, inflatable curtains may extend from the A-pillar to the C-pillar of the vehicle. In alternative embodiments, inflatable curtains may extend from the A-pillar to the D-pillar of the vehicle.

Inflatable curtain airbags are typically installed adjacent the roof rail of a vehicle in an undeployed state, where the curtain airbag is rolled or folded or a combination thereof and optionally located within a sock. Conventionally, inflatable curtains include attachment tabs at the top edge and at various locations along the longitudinal length of the inflatable curtain. During a conventional installation, bolts or other fasteners are used to attach each attachment tab to the roof rail or similar structure of the vehicle.

The conventional process of affixing each attachment tab to the roof rail of a vehicle through a fastener often requires a relatively significant amount of assembly and installation time and requires a lot of hardware, such as multiple bolts or other fasteners.

FIG. 1 depicts one embodiment of an airbag assembly 100 as shown from a perspective view. Airbag assembly 100 comprises an inflatable curtain airbag 102 and first and second tensioning mechanisms 104, 106. In other embodiments, alternative airbags may be used, such as front, side, overhead and knee airbags.

The inflatable curtain 102 of FIG. 1 is mounted inside a vehicle 10 to the roof rail 12. Inflatable curtain 102 includes a mounting surface, which may comprise the top edge of the curtain 102, which is mounted to the roof rail 12. Inflatable curtain 102 may extend from the A-pillar 14 to the C-pillar 16 to provide impact protection for passengers sitting along the side structure of vehicle 10.

Inflatable curtain 102 includes inflatable chambers (not shown), which are in fluid communication with an inflator 108, optionally via a gas guide 110. Inflator 108 may be a pyrotechnic, gas-generating device to rapidly produce inflation gas in a collision scenario. Inflatable curtain 102 receives the inflation gas generated by inflator 108, and provides impact protection for vehicle occupants during a collision.

In the embodiment of FIG. 1, inflator 108 is positioned near the center of inflatable curtain 102, adjacent its top edge in a mid-fill position. In alternative embodiments, inflator 108 may be located at either end of inflatable curtain 102, in an end-fill position. Inflator 108 may be mounted to the vehicle body with screws, clips, hooks or alternative methods appreciated by those having skill in the art with the aid of the present disclosure.

During installation, the mounting surface of inflatable curtain 102 is positioned along the roof rail 12 and may engage a series of hooks or protrusions that extend from the roof rail 12 of vehicle 10. The hooks may be stamped into or attached to the car body and receive corresponding openings in the airbag fabric or separate attachment tabs.

In order to maintain inflatable curtain 102 in its desired mounting position along the roof rail 12 of vehicle 10, a tensioning force is supplied along the longitudinal length of inflatable curtain 102. In some embodiments, the tensioning force may be applied at one or each end of the curtain 102 or near a mid-section of the curtain 102 or some alternative position.

In the embodiment depicted in FIG. 1, the tensioning force is applied adjacent both ends of inflatable curtain 102 through first and second tensioning mechanisms 104, 106. Tensioning mechanisms 104, 106 may be attached to the vehicle body. First tensioning mechanism 104 provides a tensioning force along the longitudinal mounting surface and towards the front end of the vehicle 10. Second tensioning mechanism 106 also provides a tensioning force along the mounting surface, but towards the rear end of the vehicle 10. Alternatively, a single tensioning mechanism may be used to provide the tension necessary to maintain inflatable curtain 102 in its mounted position.

FIG. 2 depicts another embodiment of an airbag assembly 200 as shown from a side elevation view. Airbag assembly 200 comprises an inflatable curtain 202 and a spool tensioning device 204. Spool tensioning device 204 is coupled to inflatable curtain 202 via a tether 210. Tether 210 may be constructed of fabric, plastic, metal or other suitable material. Tether 210 is wound around spool tensioning device 204 until tether 210 is taught and a tensioning force is applied to the end of inflatable curtain 202 opposite inflator 208. When tether 210 is under tension, it secures inflatable curtain 202 in its desired installation position by transmitting tension from the spool tensioning device 204 to the inflatable curtain 202.

Inflatable curtain 202 of FIG. 2 is disposed in an end-fill arrangement where inflator 208 is disposed at one end of inflatable curtain 202. Inflatable curtain 202 is coupled to the vehicle via an inflator mounting 212. Inflatable curtain 202 may also be mounted to the vehicle through mounting orifice 214. Mounting orifice 214 may engage a corresponding hook or protrusion that extends from the roof rail of a vehicle. Inflatable curtain 202 is secured in its mounted and installed position by applying tension along the longitudinal length of curtain 202 via spool tensioning device 204. The tension applied to inflatable curtain 202 is sufficient to properly maintain curtain 202 in its desired mounting position, but to also keep inflatable curtain 202 in its installed position during deployment.

FIG. 3 depicts the spool tensioning device 204 of FIG. 2 within sphere 3-3, from an exploded perspective view. Spool tensioning device 204 may comprise a fastener, such as a bolt 216, a washer 218 which receives bolt 216, a tether-engaging spool clutch 220 and a self-locking fastener 222, such as those sold under the Palnut® brand, which both receive bolt 216. Spool clutch 220 is sized such that an interference fit with bolt 216 is created when spool tensioning device 204 is assembled. Bolt 216 may be a currently commercially available bolt, or alternatively, may be customized for the particular spool tensioning device. Tether 210 engages spool clutch 220 and is wound around spool clutch 220 as bolt 216 is rotated when spool tensioning device 204 is mounted to the vehicle body.

Figure 4:
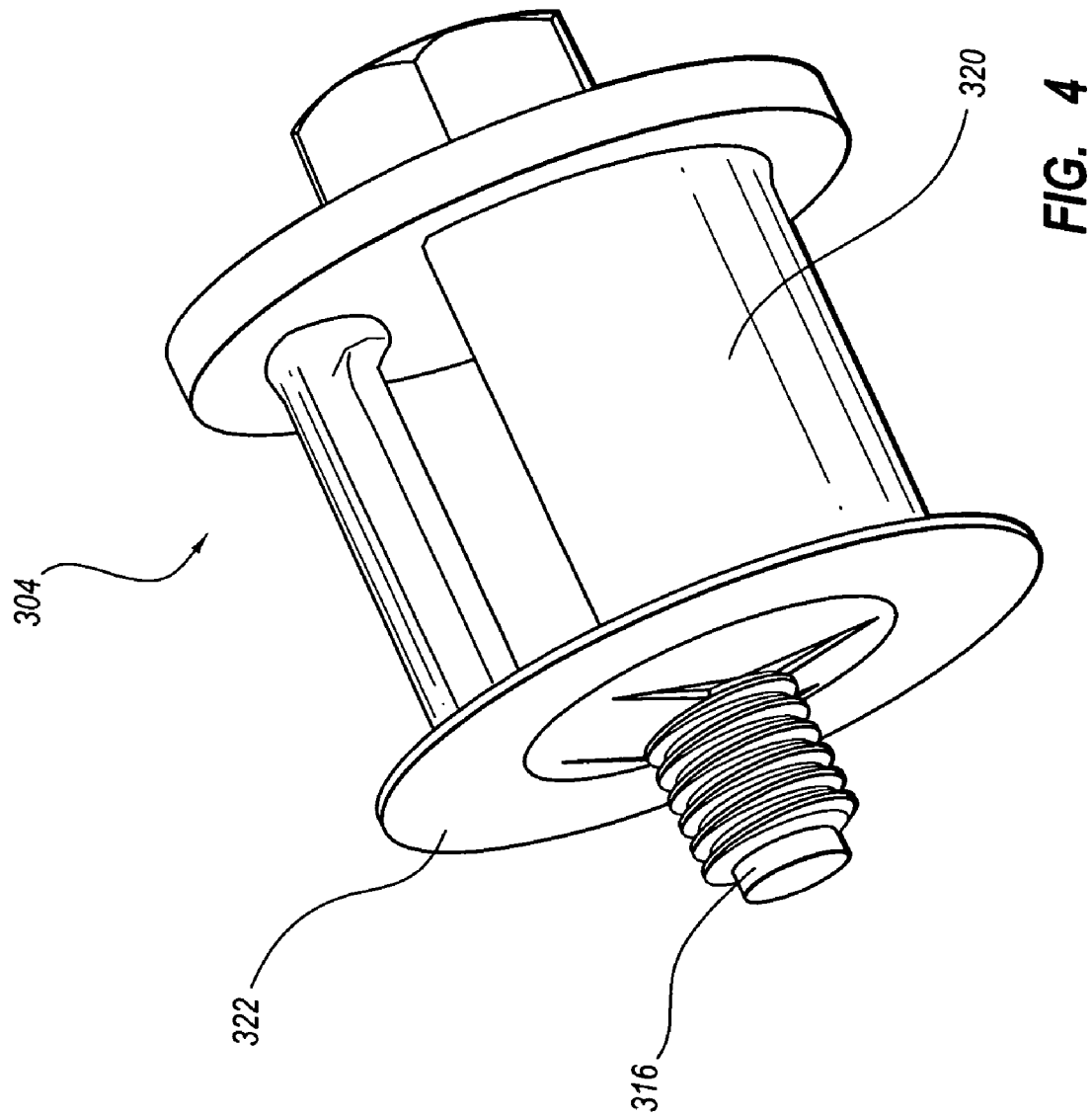
FIG. 4 is a perspective view of another embodiment of a spool tensioning device.

FIG. 4 depicts another embodiment of a spool tensioning device 304 from a perspective view. As with the spool tensioning device 204 of FIG. 3, spool tensioning device 304 comprises a bolt 316 which has an interference fit with a spool clutch 320 and self-locking fastener 322. For purposes of this application the term "clutch" refers to a torque-limiting device that turns with a driving force until a specified torque is achieved, whereupon the clutch ceases to turn while the driving force is still applied.

For example, spool tensioning device 304 may be coupled to a tether (not shown), which in turn is coupled to an airbag, such as an inflatable curtain. As the spool tensioning device 304 is mounted to the body of a vehicle, the bolt 316 turns along with the spool clutch 320, since there is an interference fit of the spool clutch 320 on the shank of bolt 316. As device 304 is screwed onto the body of a vehicle, the tether winds around the spool clutch 320 and tensions the inflatable curtain in its desired mounting position.

As bolt 316 continues to turn, the tether winds around spool clutch 320 until the tension force of the tether overcomes the interference force and causes the interference fit of the spool clutch 320 to slip. The spool clutch 320 continues to slip as bolt 316 is being rotated. The tension on the inflatable curtain remains constant as bolt 316 continues to rotate until bolt 316 is driven all the way into the vehicle body. As bolt 316 is tightened to the vehicle body, spool clutch 320 is locked in place through a compressive force. FIGS. 6A through 7B show this aspect in greater detail.

The desired or specified tension of the tether that causes the interference fit to slip corresponds to the kinetic friction of slip between the spool material and the bolt 316. The use of the spool tensioning device 304 disclosed herein allows an airbag, such as an inflatable curtain to be installed into a vehicle and drawn to a desired tension consistently, within a given tolerance.

The use of spool tensioning device 304 when installing an inflatable curtain (or alternative airbag) may help minimize the need for additional hardware, such as fasteners that are typically used at each attachment point along the top edge of the inflatable curtain. This may also decrease the assembly and installation time associated with inflatable curtains, since the tensioning force may supersede the need to install fasteners at each attachment point of the inflatable curtain. Furthermore, the spool clutch 320 allows for an airbag to be installed under a desired, repeatable tension.

Figure 5B:
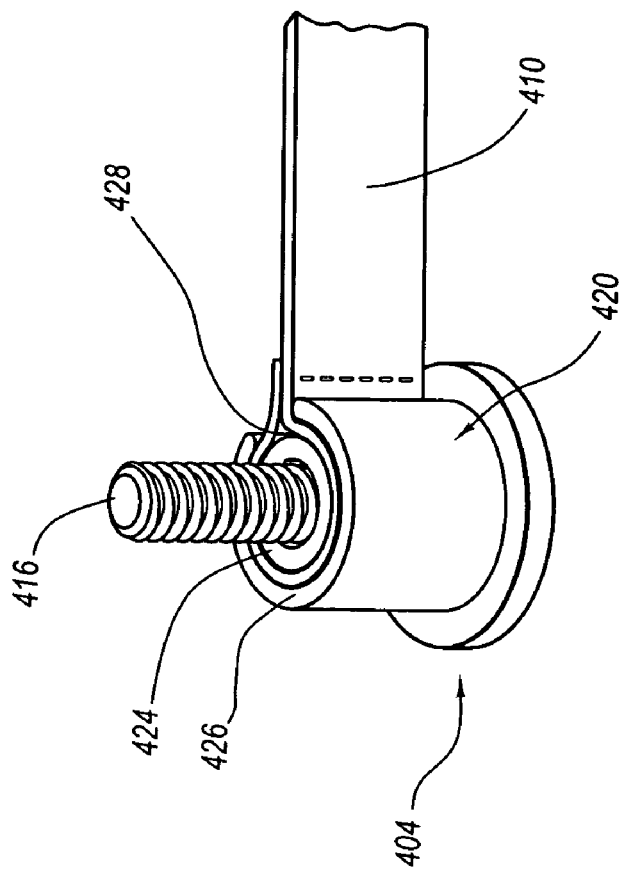
FIG. 5B is a perspective view of the spool tensioning device of FIG. 5A coupled to a tether.
Figure 5A:
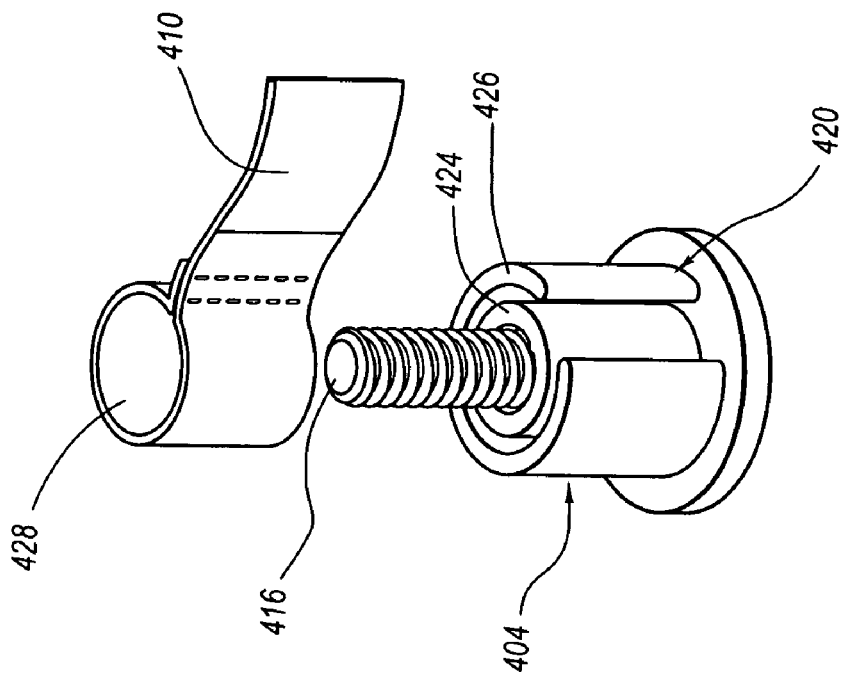
FIG. 5A is a perspective view of one embodiment of a spool tensioning device before being coupled to an tether.

FIGS. 5A and 5B depict one embodiment of a spool tensioning device 404 as shown from a perspective view. The spool tensioning device 404 comprises a spool clutch 420 coupled to a bolt 416. The spool clutch 420 may comprise an inner annular component 424 and an outer annular component 426. A gap exists between the inner 424 and outer 426 annular components as well as in the body of the outer annular component 426 to receive a tether 410 having a loop 428 at one end. The other end of tether 410 is attached to or otherwise coupled to the inflatable curtain (not shown). When tether 410 is coupled to spool clutch 420, the spool tensioning device 404 may be rotated to provide tension to the airbag via tether 410.

In alternative embodiments, a cable or similar structure may be coupled to a spool tensioning device. In inflatable curtain airbag applications, the cable may extend along the longitudinal length, or a portion of the longitudinal length of the mounting surface through a channel or series of sleeves which receive the cable. In such an embodiment, the cable may not be attached directly to the curtain airbag, but is coupled to it through a pocket, sleeve or channel. Tension applied to the cable by rotating the spool tensioning device may be accomplished through the general principles as described herein. The tensioned cable may be sufficient to provide the necessary tension to maintain the curtain airbag in its desired, installed position.

FIG. 6A depicts another embodiment of a spool tensioning device 504 coupled to a tether 510 as shown from a side elevation view. The tether 510 is also coupled to an airbag (not shown). As depicted in FIG. 6A, the tether 510 is loose and winding around the spool tensioning device 504. As the spool tensioning device 504 rotates while being installed, bolt 516 and spool clutch 520 turn together since there is an interference fit of the spool clutch 520 on the shank of bolt 516. The winding of tether 510 around spool tensioning device 504 brings the airbag into its desired mounting position.

FIG. 6B depicts the spool tensioning device 504 of FIG. 6A in which spool clutch 520 is stationary while bolt 516 is turning. Once the tension force on tether 510 overcomes the interference force of spool clutch 520 on the shaft of bolt 516, the interference fit of spool clutch 520 begins to slip. The spool clutch 520 continues to slip as bolt 516 is tightened. The tension on the inflatable curtain remains constant as bolt 516 continues to be driven until bolt 516 is tightened against the vehicle body.

Figure 7B:
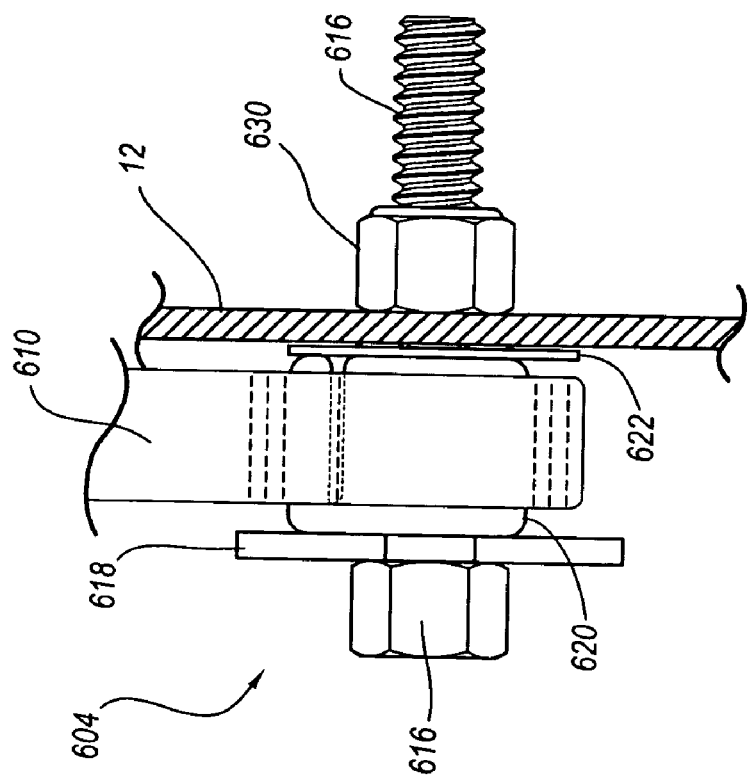
FIG. 7B is a side elevation cross-sectional view of the spool tensioning device of FIG. 7A mounted to the vehicle body after the bolt is fastened and the spool tensioning device is locked in its position.
Figure 7A:
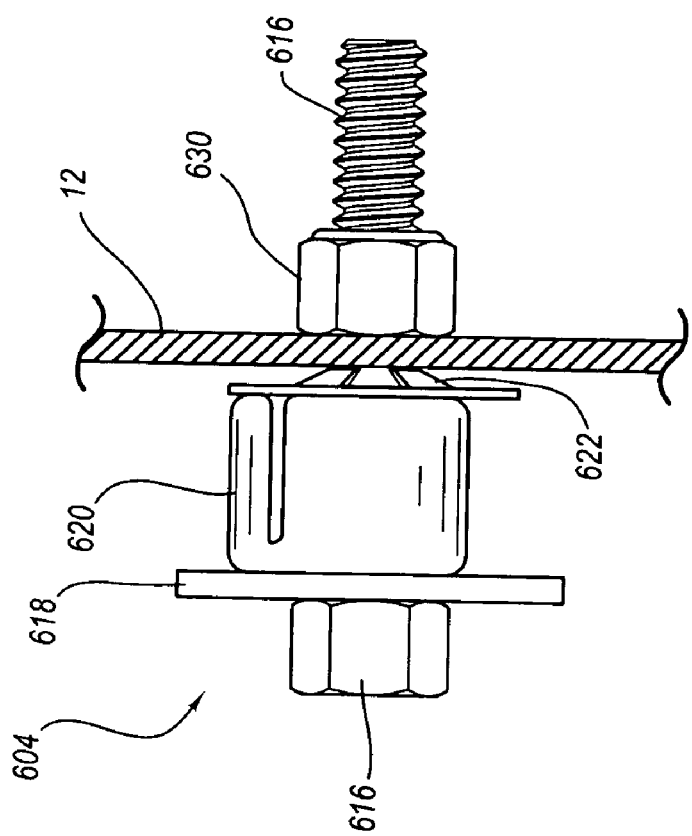
FIG. 7A is a side elevation cross-sectional view of one embodiment of a spool tensioning device mounted to a vehicle body previous to being fully tightened.

FIG. 7A represents a spool tensioning device 604 coupled to a vehicle body, such as the roof rail 12 as shown from a side elevation view, where the roof rail 12 is cross-sectioned and partially cut away. Spool tensioning device 604 comprises a bolt 616, a washer 618, a spool clutch 620 and a self-locking fastener 622, such as those sold under the Palnut® brand. Bolt 618 may optionally be received on the opposite side of roof rail 12 by a weld nut 630. Spool tensioning device 604 of FIG. 7A has not yet been fully fastened to roof rail 12, such that bolt 616 is capable of being further tightened against roof rail 12. If the tension force of tether 610 (shown in FIG. 7B) overcomes the interference force of spool clutch 620, the interference fit will slip. Spool clutch 620 will then continue to slip as bolt 616 is being rotated and driven into roof rail 12. The tension on the inflatable curtain (not shown) remains constant as bolt 616 continues to rotate.

FIG. 7B represents spool tensioning device 604 of FIG. 7A after bolt 616 has been tightened to roof rail 12 and the spool clutch 620 is locked in place. As bolt 616 is tightened to roof rail 12, spool clutch 620 is locked in its position through a compressive force. Tension on the airbag (not shown) via tether 610 is maintained when spool clutch 620 is locked against roof rail 12. The compressive force applied by fastening bolt 616 also fulfills installation requirements to output a torque measurement.

Figure 8:
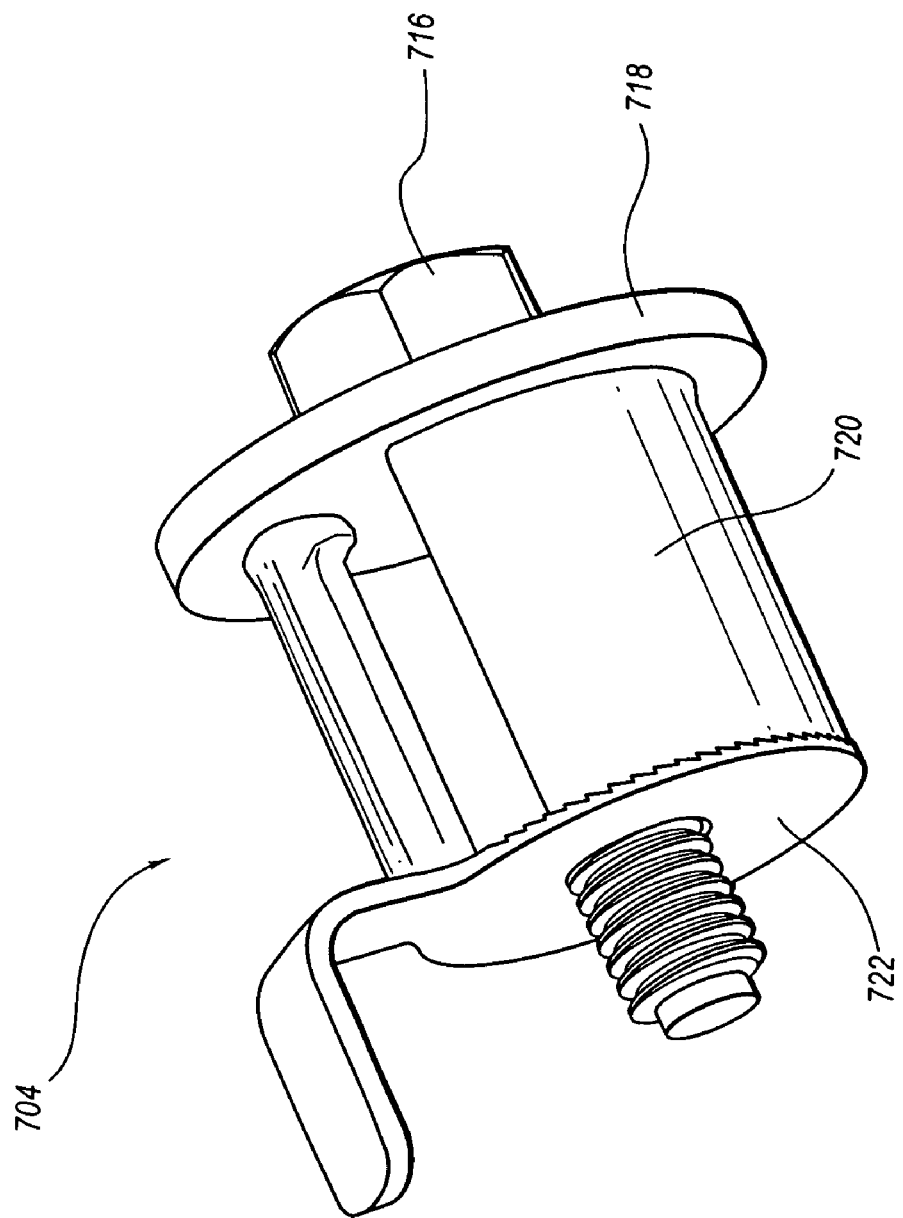
FIG. 8 is a perspective view of another embodiment of a spool tensioning device including a locking washer.

FIG. 8 depicts another embodiment of a spool tensioning device 704 as shown from a perspective view. Spool tensioning device 704 comprises a bolt 716 which is received by a spool clutch 720 in an interference fit as heretofore described. A washer 718 may also be used adjacent the head of bolt 716. Alternatively, a separate washer may not be needed, for example, when the head of spool clutch 720 is integrally formed with the spool. In this embodiment, a locking washer 722 may also be used as a locking device to maintain spool clutch 720 in its locked position after spool tensioning device 704 is mounted to the vehicle body.

In some situations after an airbag is installed using the spool tensioning devices disclosed, the deployment forces of an activated airbag may provide a strong enough torque, through the tether or cable, to cause bolt 716 to unthread from its position in the vehicle body. Consequently, an additional locking device, such as locking washer 722, may be used to prevent the rotation of spool clutch 720 when an airbag is deployed after spool clutch 720 is in its locked position against the vehicle body. Locking washer 722 may comprise radial serrations which abut one face of spool clutch 720. The serrations may be positioned against the direction of rotation, i.e., a counter-clockwise rotation, which may occur during deployment of the installed airbag. Alternative locking devices may also be used as would be appreciated by those having skill in the art with the aid of the present disclosure.

Figure 9B:
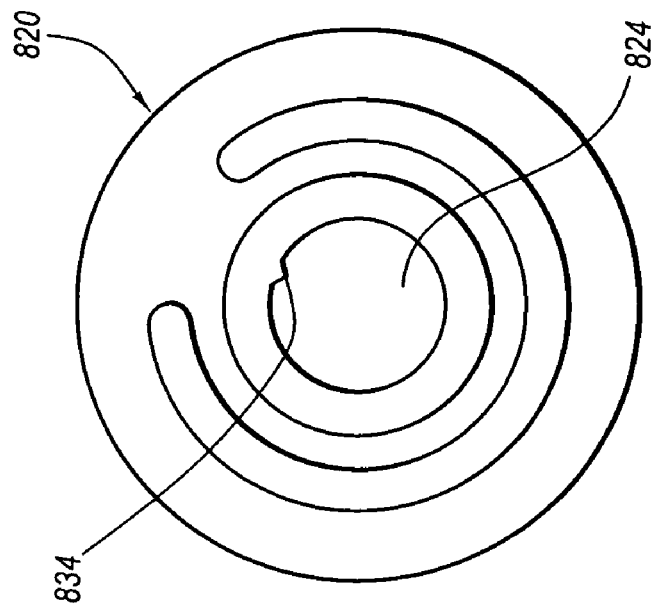
FIG. 9B is a top plan view of another embodiment of a spool tensioning clutch for use with the fastener of FIG. 9A.
Figure 9A:
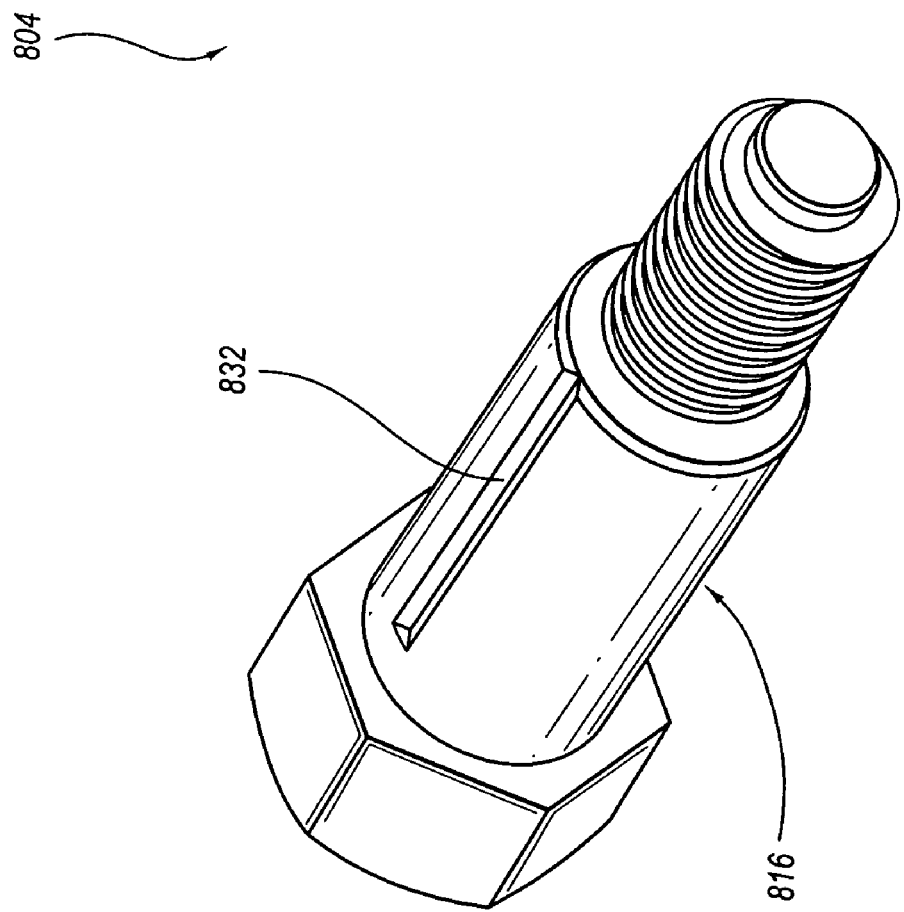
FIG. 9A is a perspective view of one embodiment of a fastener used with a spool tensioning clutch of FIG. 9B.

Furthermore, alternative clutch designs, other than the embodiments heretofore disclosed may also be used which provide a torque limiting device in tension-mounted airbag applications. FIGS. 9A and 9B represent components of an alternative spool tensioning device 804. FIG. 9A depicts a fastener, such as bolt 816 from a perspective view. FIG. 9B depicts a spool tensioning clutch 820 from a top plan view. Bolt 816 is slidably received by inner cavity 824 of spool clutch 820. Bolt 816 may include a groove 832 for receiving a corresponding protrusion 834 within the wall of inner cavity 824 of spool clutch 820. Protrusion 834 comprises a break out section, which is configured to break away from the wall of inner cavity 824 under a particular force.

Accordingly, as bolt 816 is driven, the tether (not shown) coils on the outside of spool clutch 820 and tensions the airbag in place. When the tension force overcomes the break out force, protrusion 834 breaks away from the wall of inner cavity 824 and spool clutch 820 slips and ceases to turn with bolt 816. The tension on the airbag remains constant as bolt 816 is driven until tightened to a specified torque, locking spool clutch 820 under a compression force. A locking device, such as the locking washer of FIG. 8 may optionally be used.

Figure 10B:
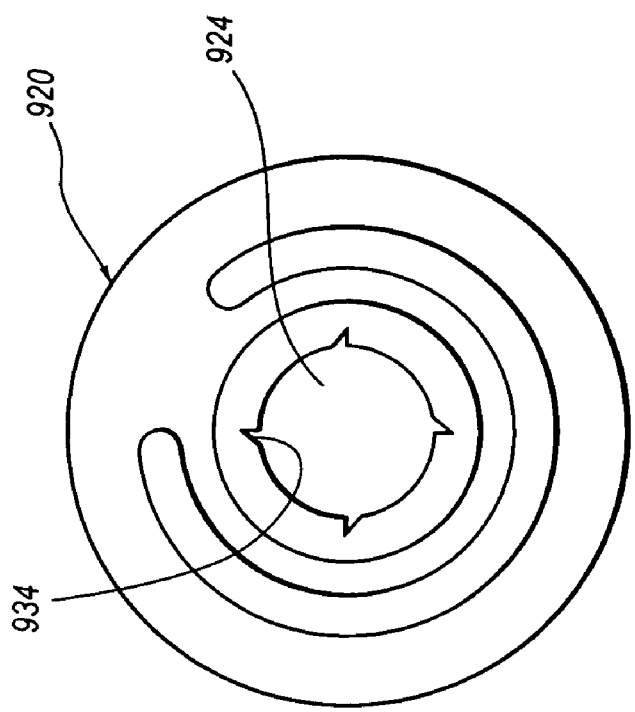
FIG. 10B is a top plan view of another embodiment of a spool tensioning clutch for use with the fastener of FIG. 10A.
Figure 10A:
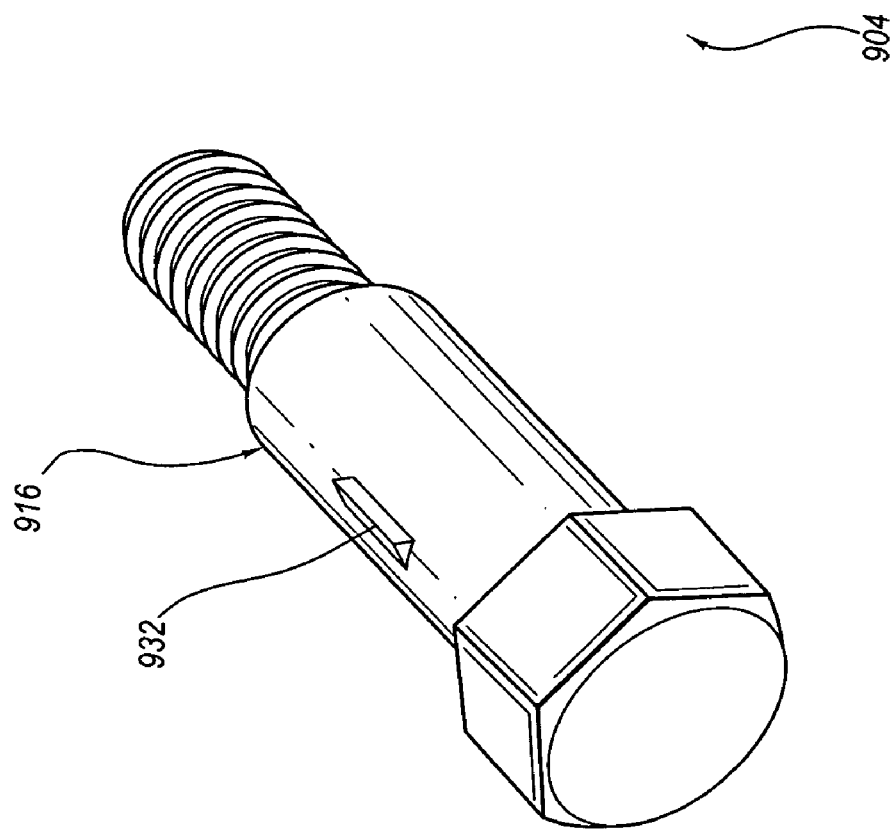
FIG. 10A is a perspective view of another embodiment of a fastener used with a spool tensioning clutch of FIG. 10B.

FIGS. 10A and 10B represent components of another alternative embodiment of a spool tensioning device 904. FIG. 10A depicts a fastener 916 from a perspective view and FIG. 10B depicts a corresponding spool tensioning clutch 920 from a top plan view. Bolt 916 is slidably received by inner cavity 924 of spool clutch 920. Bolt 916 may include a spring-loaded wedge detent 932 which extends from the shank of bolt 916. Wedge detent 932 may optionally extend along a greater length of bolt shank than depicted in FIG. 10A. Wedge detent 932 may be slidably received by a corresponding channel 934 within the wall of inner cavity 924 of spool clutch 920. Once a particular torque to spool clutch 920 is achieved, wedge detent 932 is configured to depress against the force of its internal spring relative to the bolt shank and relative to its position in channel 934. The bolt 916 may then rotate within inner cavity 924 of spool clutch 920.

As spool tensioning device 904 is installed, bolt 916 is rotated along with spool clutch 920. The tether (not shown) interconnecting spool tensioning device 904 and the airbag coils on the outside of spool clutch 920 and tensions the airbag in its desired mounting position. When the tension force overcomes the spring force of wedge detent 932, wedge detent 932 slips from its position in channel 934 and spool clutch 920 slips and ceases to turn with bolt 916. The tension on the airbag remains fairly constant as bolt 916 is driven until tightened to a specified torque, locking the spool clutch 920 under a compression force.

Figure 11:
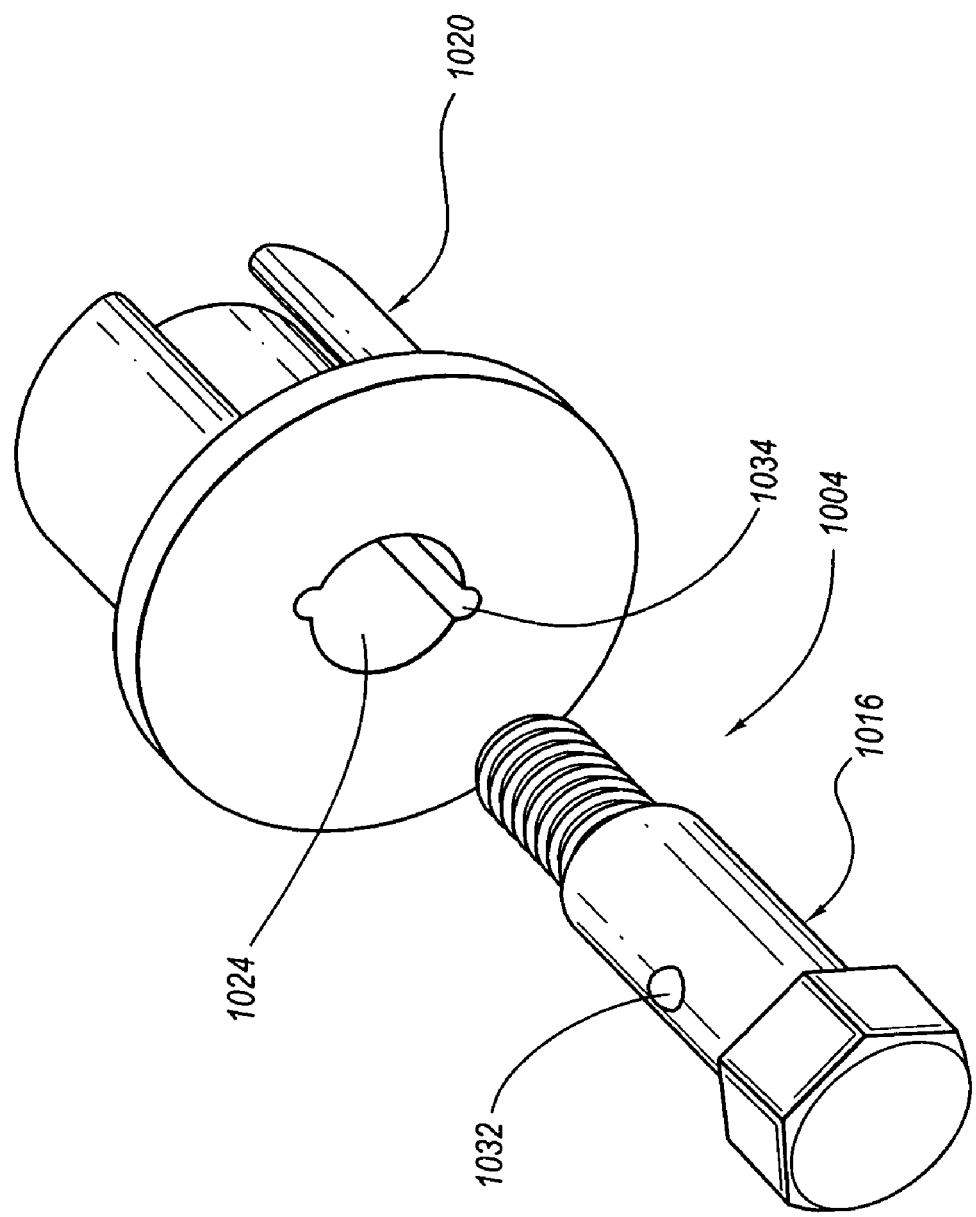
FIG. 11 is an exploded perspective view of another embodiment of a spool tensioning device.

FIG. 11 depicts another alternative embodiment of a spool tensioning device 1004 from a perspective view. Spool tensioning device 1004 may comprise a fastener 1016 and a corresponding spool tensioning clutch 1020. Bolt 1016 is slidably received by inner cavity 1024 of spool clutch 1020. Bolt 1016 may include a ball detent mechanism 1032 which may extend from the shank of bolt 1016. As bolt 1016 is inserted into spool clutch 1020, ball detent 1032 fits within a corresponding channel 1034 within the wall of inner cavity 1024. A second ball detent may be located on the opposite side of the bolt shank from ball detent 1032, which would be received by the second channel in the wall of inner cavity 1024. Once a particular torque to spool clutch 1020 is achieved, ball detent 1032 is configured to depress against the force of its internal spring relative to the bolt shank and relative to its position in channel 1034. The bolt 1016 may then rotate within inner cavity 1024 of spool clutch 1020.

When spool tensioning device 1004 is installed, both bolt 1016 and spool clutch 1020 initially rotate together. The tether (not shown), interconnecting spool tensioning device 1004 and the airbag, coils around the outside of spool clutch 1020 and tensions the airbag in its desired mounting position. When the tension force overcomes the spring force of ball detent 1032, ball detent 1032 slips from its position in channel 1034. Spool clutch 1020 slips as a result and no longer turns with bolt 1016. However, the tension on the airbag remains fairly constant as bolt 1016 is driven its remaining distance until tightened to a specified torque, locking the spool clutch 1020 under a compression force.

Figure 12:
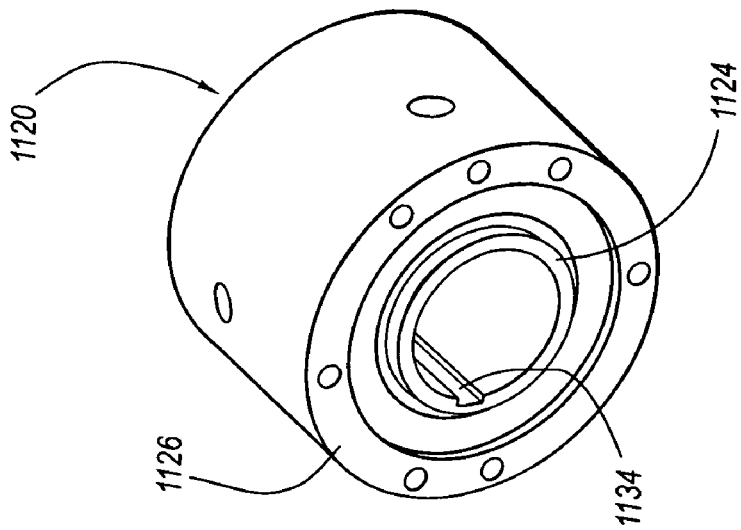
FIG. 12 is a perspective view of another embodiment of a spool tensioning clutch.

FIG. 12 depicts another embodiment of a spool tensioning clutch 1120 which may be used with the spool tensioning devices disclosed herein. Spool tensioning clutch 1120 comprises an over-running clutch in which inner cylinder 1124 can be rotated clockwise with a fastener (not shown) which may be received therein. Such over-running clutch mechanisms may be commercially available. A channel 1134 may optionally be disposed in the wall of inner cylinder 1124 to receive a corresponding protrusion extending from the shank of the fastener. When torque is applied in the counter-clockwise direction, the tether that coils around outer cylinder 1126 does not retract.

Figure 13B:
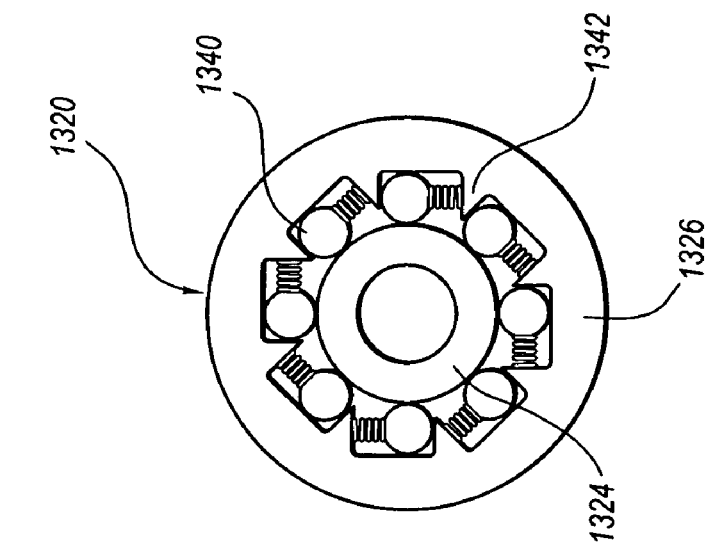
FIG. 13B is a cross-sectional side elevation view of another embodiment of the spool tensioning clutch of FIG. 12.
Figure 13A:
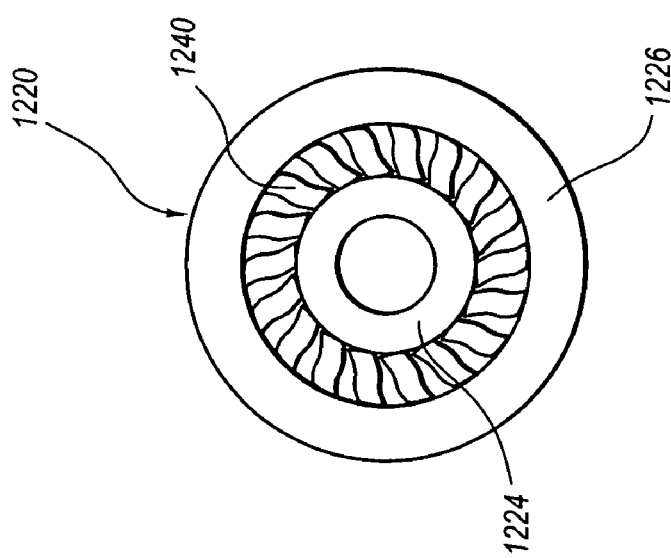
FIG. 13A is a cross-sectional side elevation view of one embodiment of the spool tensioning clutch of FIG. 12.

FIGS. 13A and 13B each represent alternative embodiments of the spool tensioning clutch of FIG. 12, as shown from a side elevation cross-sectional view. FIG. 13A represents a spring clutch 1220 which comprises a series of springs 1240 disposed between inner cylinder 1224 and outer cylinder 1226. FIG. 13B represents a roller ramp clutch 1320 which comprises a series of ball detent mechanisms 1340 which coordinate with internal ramps 1342, all disposed between inner cylinder 1324 and outer cylinder 1326 of clutch 1320. Alternative over-running clutch devices may also be used as would be apparent to those having skill in the art with the aid of the present disclosure.

The spool tensioning devices 104, 106, 204, 304, 404, 504, 604, 704, 804, 904, 1004 disclosed herein are examples of means for providing tension along the mounting surface of the inflatable curtain. Furthermore, the cables and tethers 210, 410, 510 disclosed herein are examples of means for coupling the mounting surface of the inflatable curtain to the tensioning means. Moreover, the clutches 220, 230, 420, 520, 620, 720, 820, 920, 1020, 1120, 1220, 1320 disclosed herein are examples of means for obtaining a desired tension level repeatably.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the invention is therefore defined by the following claims.

The invention claimed is:

1. An airbag assembly, comprising:
an airbag including a mounting surface, the mounting surface configured to be coupled to a vehicle;
a tensioning mechanism configured to maintain the airbag in a desired position upon installation; and
a securing member to transmit tension from the tensioning mechanism to the mounting surface to maintain the airbag in a desired position upon installation;
wherein the tensioning mechanism comprises a spool clutch and a fastener configured to rotate together and wind up the securing member such that the securing member applies increasing tension to the airbag until a particular tension level is reached, whereupon the spool does not rotate and maintains the particular tension level on the airbag while the fastener continues to rotate.

2. The airbag assembly of claim 1, wherein the airbag comprises an inflatable curtain airbag.

3. The airbag assembly of claim 2, wherein the mounting surface comprises a top edge of the inflatable curtain airbag configured to be mounted adjacent a roof rail of a vehicle.

4. The airbag assembly of claim 1, wherein the securing member comprises a tether attached to the mounting surface of the airbag.

5. The airbag assembly of claim 1, wherein the securing member comprises a cable extending along at least a portion of the mounting surface of the airbag.

6. The airbag assembly of claim 1, wherein the spool and the fastener are coupled to each other in an interference fit.

7. The airbag assembly of claim 6, wherein the particular tension level is approximately equal to the force needed to overcome the interference fit.

8. The airbag assembly of claim 1, further comprising a locking device to prevent the spool from rotating when receiving a deployment force from the tether when the airbag deploys.

9. The airbag assembly of claim 8, wherein the locking device comprises a locking washer having radial serrations which abut the spool.

10. The airbag assembly of claim 1, further comprising a break out section which is configured to break away when the particular tension level is reached, wherein the break out section is located on at least one of: the fastener or the spool.

11. The airbag assembly of claim 1, further comprising a spring wedge detent mechanism, wherein the spring wedge detent mechanism is located on at least one of: the fastener or the spool.

12. The airbag assembly of claim 1, further comprising a ball and spring detent mechanism, wherein the ball and spring detent mechanism is located on at least one of: the fastener or the spool.

13. The airbag assembly of claim 1, wherein the spool comprises an over-running clutch.

14. The airbag assembly of claim 1, further comprising more than one tensioning mechanism comprising a clutch.

15. A tensioning mechanism to provide tension to an inflatable curtain airbag during installation within a vehicle, the tensioning mechanism comprising:
a fastener component having an end configured to fasten the tensioning mechanism to a vehicle upon the application of torque to the fastener component; and
a clutch component configured to coil a tether extending from the inflatable curtain, the clutch component having an inner cavity receiving the fastener component;
wherein the fastener component and clutch component are configured to rotate together when coiling a tether until a particular tension level is reached, whereupon the fastener component rotates independent of the clutch component.

16. The tensioning mechanism of claim 15, wherein the fastener component and the clutch component are coupled in an interference fit.

17. The tensioning mechanism of claim 15, further comprising a locking device to prevent the clutch component from uncoiling a portion of the tether when receiving a deployment force.

18. The tensioning mechanism of claim 15, further comprising a break out section which is configured to break away when the particular tension level is reached, the break out section disposed on one of the fastener component or the clutch component.

19. The tensioning mechanism of claim 15, further comprising a detent mechanism which is configured to slip when the particular tension level is reached, the detent mechanism disposed on one of the fastener component or the clutch component.

20. The tensioning mechanism of claim 15, wherein the clutch component comprises an over-running clutch.

21. A method for installing an inflatable curtain airbag in a vehicle, comprising:
positioning a mounting surface of the inflatable curtain airbag in a mounting position adjacent the roof rail of a vehicle, wherein the airbag is coupled to a securing member, wherein the securing member is coupled to a spool clutch;
securing the inflatable curtain airbag to the vehicle by mounting the spool clutch to the vehicle via a fastener; and providing a tensioning force longitudinally along a portion of the mounting surface when the inflatable curtain is in the mounting position, wherein providing a tensioning force comprises:

rotating the spool clutch together with the fastener to wind up the securing member such that the securing member applies increasing tension to the airbag until a particular tension level is reached, whereupon the spool does not rotate and maintains the particular tension level on the airbag while the fastener continues to rotate.

22. The method of claim 21, wherein the securing member comprises a tether attached to the inflatable curtain airbag, and actuating a clutch comprises rotating a fastener coupled to the clutch to coil the tether around the clutch.

23. The method of claim 21, wherein the securing member comprises a cable received by the inflatable curtain airbag, and actuating a clutch comprises rotating a fastener coupled to the clutch to coil the cable around the clutch.

* * * * *